United States Patent Office 2,707,797
Patented May 10, 1955

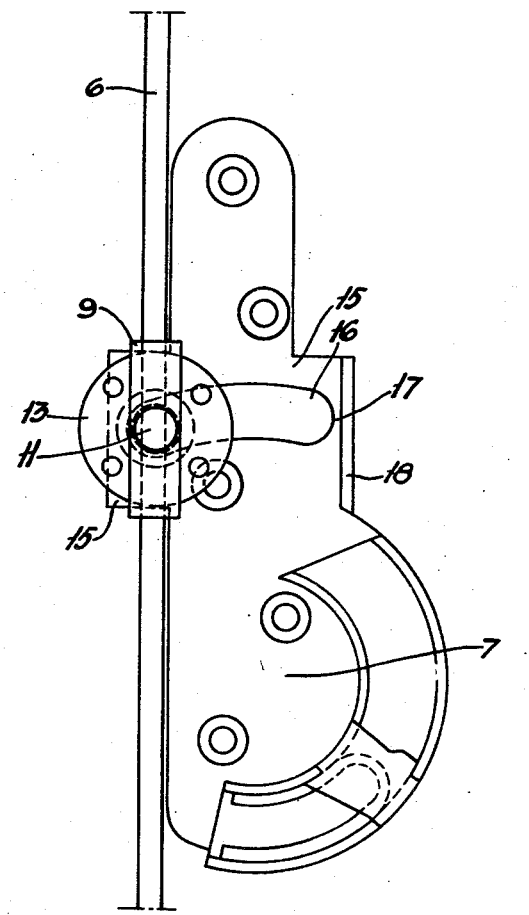

2,707,797
STOPPING DEVICE FOR PIVOTED WINDOWS

Paul G. V. Juhlin, Stockholm, and Börje Åkerström, Nasby Park, Sweden, assignors to AB Atvidabergs Butiksinredningar, Stockholm, Sweden Application May 28, 1952, Serial No. 290,594
Claims priority, application Sweden May 30, 1951
2 Claims. (Cl. 16—144)

The present invention relates to a stopping device for pivoted windows of the kind which can be locked to the window frame by means of a locking rod. Such windows have the drawback that they rotate easily when they are unlocked whereby much damage is caused. The object of the invention is to overcome this drawback. The invention is substantially characterized by a protruding part or the like provided on the locking rod which portion in the position of the handle of the rod when it is not locked, is arranged to actuate a member attached for example to the sash in such a manner that it engages a fitting attached to the window sill. According to the invention the protruding portion may be provided with a sliding or camming surface shaped in such a manner that it brings the said member into engagement with the fitting when the locking rod is moved from the locking position. The member may consist of a bolt which against the action of a spring or the like is movable into engagement with the fitting. There is a groove in the fitting which may be in engagement with the bolt, the said groove being arranged in such a manner that it stops the swinging motion of the bolt and the sash at a predetermined point. A brake device may also be provided in the groove, for example a spring, which bears against the bolt and strives to retain it. The outside of the fitting is preferably provided with an edge bevelled in such a manner that the bolt can more easily slide onto the fitting and into the groove from the position in which it is located outside the fitting.

An embodiment of the invention is illustrated in the accompanying drawing in which:

Fig. 5 is a fragmentary top plan view showing the locking rod with the device according to the invention the locking rod being in the unlocking position and the sash unopened.

Figure 1:
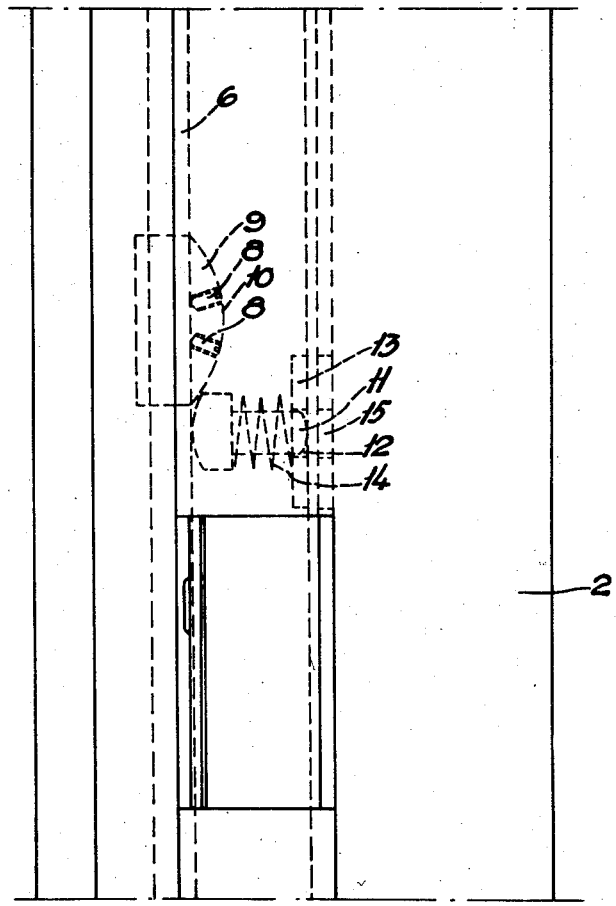
Fig. 1 shows a window sill with sash viewed from the front and with the locking rod and the device according to the invention in dotted lines, the locking rod being in the locking position.
Figure 2:
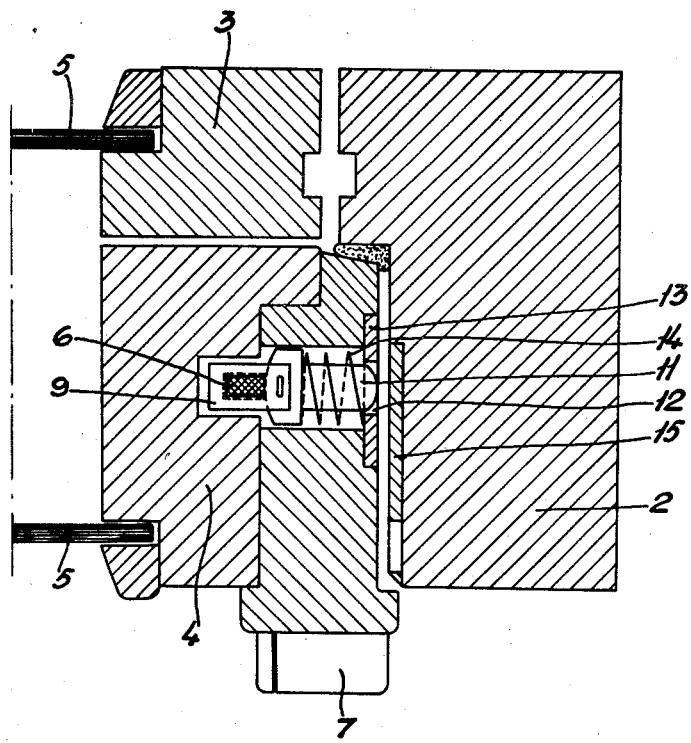
Fig. 2 shows a section through the window sill with sash, the locking rod being in the locking position.
Figure 3:
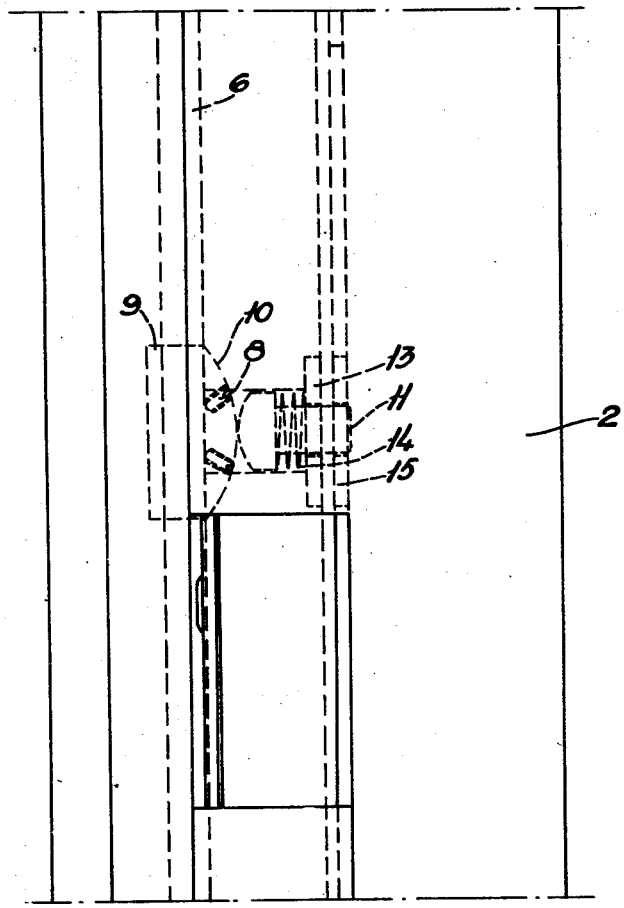
Fig. 3 shows the window sill with sash according to Fig. 1 the locking rod being in the unlocking position.
Figure 4:
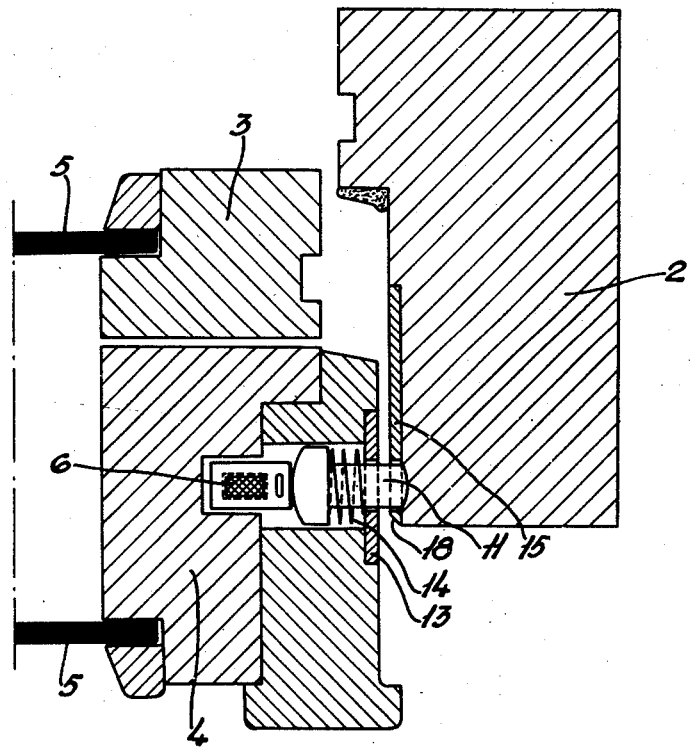
Fig. 4 shows a section through the window sill with sash according to Fig. 2 the locking rod being in the unlocking position.

The character 2 designates the window sill, 3 and 4 two coupled sashes, 5 designates the window pane, 6 the locking rod and 7 designates a hinge device for horizontally swingable window sashes, attached to the window sill and the sash.

On the rod 6 which is arranged displaceably in the sash 4 and which protrudes into the aperture in the frame to lock the sash closed, a projection 9 in the shape of a successively increasing and decreasing sliding or camming surface 10 is removably attached by means of screws 8, which sliding surface is moved with the top rod when it is moved. In the sash 4 a bolt 11 is displaceably arranged at a right angle to the rod 6, which bolt 11 is guided in an opening 12 in a plate 13 which is attached to the edge of the sash 4 which faces the sill 2. The bolt 11 is arranged in the sash in such a manner that the sliding surface 10 projects the outer end of the bolt through the opening 12 and beyond it when the locking rod is moved from the locking position. The outward movement of the bolt 11 is carried out against the action of a spring 14 which strives to press the inner end of the bolt against the rod 6 and the camming surface 10 respectively.

On the part of the hinge 7 attached to the sill a fitting or plate 15 is arranged which is provided with an arcuate groove 16 in which the bolt 11 actuated by the sliding surface 10 runs when the rod 6 is in unlocking position and the window starts to swing round its axis. When the window has swung so much that the bolt 11 has reached the outer end 17 of the groove 16, the window is prevented from swinging further. If a further swinging of the window is desired for example for cleaning or the like it is only necessary to actuate the handle of the locking rod so that it assumes the same position as when in the locking position. The camming surface 10 then moves away from the bolt so that the spring conveys the said bolt out of the groove 16 and then the window can be swung to any desired position. To allow the bolt 11 to automatically reengage the groove 16 when the window is again closed and even though the locking rod has again been moved to the unlocking position the edge of the plate 15 which is in the path of the bolt is provided with a bevel 18 over which the bolt slides, and additionally the rod 6 will yield somewhat in the upward direction.

Having now described our invention, what we claim as new and desire to secure by Letters Patent is:

1. In a window of the type which is pivotally mounted on a vertical axis, in combination, a locking rod mounted in the window sash for reciprocating horizontal movement between two limits, a cylindrical bolt slidably mounted in the window sash for movement in a vertical direction, said bolt and said locking rod lying in the same vertical plane, a fitting mounted on the window sill, said fitting having an elongated closed end arcuate groove therein, said groove being concentric with and radially outward from the vertical axis of the window mounting and in alignment with said bolt, said groove end cooperating with said bolt to normally limit the outward pivotal movement of the window, camming means on said locking rod for moving said bolt into said groove, and means for urging said bolt upwardly toward said camming means and out of said groove, said camming means serving to move said bolt downwardly into said groove when said locking rod is moved to one of its limits to thereby limit the movement of the window about its pivotal axis.

2. In a window of the type which is pivotally mounted on a vertical axis, in combination, a locking rod mounted in the window sash for reciprocating horizontal movement between limiting positions, a cylindrical bolt slidably mounted in the window sash for movement in a vertical direction, said bolt and said locking rod lying in the same vertical plane, a fitting mounted on the window sill, said fitting having an elongated closed end arcuate groove, said groove being concentric with and radially outward from the vertical axis of the window mounting and in alignment with said bolt, camming means on said locking rod for moving the bolt into said groove when said locking rod is moved from one to another of its limiting positions, said groove then serving to limit the outward movement of the window, and an inclined bevelled edge on said fitting adjacent the closed outer end of said groove, said inclined edge serving to move said bolt upwardly against said camming means to cause said locking rod to yield vertically upward to thereby cause said bolt to reengage in said groove as said window is closed after having been opened beyond the normal limit of movement in the opening direction.

References Cited in the file of this patent
UNITED STATES PATENTS

| | | |
|---|---|---|
| 239,620 | Phillips | Apr. 5, 1881 |
| 1,068,642 | France | July 29, 1913 |
| 1,835,389 | Ghittino | Dec. 8, 1931 |
| 1,194,022 | Hudson | Aug. 8, 1916 |